US012764009B2

(12) United States Patent
Baldemair

(10) Patent No.: US 12,764,009 B2
(45) Date of Patent: Oct. 13, 2026

(54) NETWORK NODE, AND METHODS PERFORMED THEREBY FOR DETERMINING MODULATION SYMBOLS

(71) Applicant: Telefonaktiebolaget LM Ericsson (publ), Stockholm (SE)

(72) Inventor: Robert Baldemair, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 214 days.

(21) Appl. No.: 18/250,006

(22) PCT Filed: Oct. 26, 2020

(86) PCT No.: PCT/SE2020/051033
§ 371 (c)(1),
(2) Date: Apr. 21, 2023

(87) PCT Pub. No.: WO2022/093082
PCT Pub. Date: May 5, 2022

(65) Prior Publication Data
US 2023/0396479 A1 Dec. 7, 2023

(51) Int. Cl.
*H04L 27/26* (2006.01)
*G01S 7/00* (2006.01)
(Continued)

(52) U.S. Cl.
CPC .......... *H04L 27/2636* (2013.01); *G01S 7/006* (2013.01); *G01S 7/282* (2013.01); *G01S 13/26* (2013.01)

(58) Field of Classification Search
CPC ..... H04L 27/2636; G01S 7/006; G01S 7/282; G01S 13/26
(Continued)

(56) References Cited

U.S. PATENT DOCUMENTS

2008/0137524 A1* 6/2008 Anderson ............. G01S 5/0205 370/203
2010/0104044 A1 4/2010 Kishigami et al.
(Continued)

FOREIGN PATENT DOCUMENTS

EP 1868336 A2 12/2007
EP 2975790 A1 1/2016
(Continued)

OTHER PUBLICATIONS

International Search Report and Written Opinion dated Jun. 28, 2021 for International Application No. PCT/SE2020/051033 filed Oct. 26, 2020, consisting of 12-pages.
(Continued)

*Primary Examiner* — Samarina Makhdoom
(74) *Attorney, Agent, or Firm* — Weisberg I.P. Law, P.A.

(57) ABSTRACT

A method, performed by a network node. The method is for determining modulation symbols. The network node includes a modulator based on Discrete-time Fourier Transform Spread (DFTS)-Orthogonal Frequency-Division Multiplexing (OFDM). The network node determines modulation symbols to be input into the modulator. Of a first set of the modulation symbols corresponding to a duration of a DFTS-OFDM symbol, only a first subset of modulation symbols are set to first values of magnitude exceeding zero by a first threshold. The modulation symbols in the first subset are determined to have a first contiguity arrangement. The network node then initiates providing the determined modulation symbols to the modulator.

19 Claims, 9 Drawing Sheets

(51) Int. Cl.
*G01S 7/282* (2006.01)
*G01S 13/26* (2006.01)

(58) Field of Classification Search
USPC .......................................................... 342/201
See application file for complete search history.

(56) References Cited

U.S. PATENT DOCUMENTS

| | | | | |
|---|---|---|---|---|
| 2011/0261858 | A1* | 10/2011 | Baldemair | H04L 5/0053 375/E1.001 |
| 2014/0029511 | A1* | 1/2014 | Park | H04L 27/2631 370/328 |
| 2019/0173701 | A1* | 6/2019 | Ma | H04L 27/2646 |
| 2019/0302229 | A1* | 10/2019 | Ling | G01S 13/003 |
| 2021/0286045 | A1* | 9/2021 | Bayesteh | H04B 7/0695 |
| 2021/0320760 | A1* | 10/2021 | Rastegardoost | H04L 1/1854 |

FOREIGN PATENT DOCUMENTS

| | | | | | |
|---|---|---|---|---|---|
| GB | 2558586 | A * | 7/2018 | | H04L 27/2636 |
| WO | WO-2014140520 | A1 * | 9/2014 | | H04L 1/0071 |

OTHER PUBLICATIONS

J. Mietzner; DFT-Spread OFDM MIMO-Radar—An Alternative for Reduced Crest Factors; The 20th International Radar Symposium IRS 2019; Jun. 26-28, 2019, consisting of 10-pages.
J. Mietzner et al.; Space-Tim Waveform Coding for Joint Radar and Wireless Communications (RadCom) Applications; 2020 IEEE Wireless Communications and Networking Conference (WCNC); May 25, 2020, consisting of 8-pages.
3GPP TSG RAN WG1 #42 on LTE R1-050702; Title: DFT-Spread OFDM with Pulse Shaping Filter in Frequency Domain in Evolved UTRA Uplink; Agenda Item: 10.3; Source: NTT DoCoMo, NEC, Sharp; Document for: Discussion and Decision; Date and Location: Aug. 29-Sep. 2, 2005, London, UK, consisting of 8-pages.
EPO Communication with Supplementary European Search Report dated Jul. 12, 2024 for Patent Application No. 20960067.5, consisting of 7 pages.
Berardinelli, G. et al.; Zero-tail DFT-spread-OFDM signals; Globecom 2013 Workshop—Broadband Wireless Access; IEEE; 2013, consisting of 6 pages.
3GPP TSG-RAN WG1 #84b R1-162199; Title: Waveform Candidates; Agenda Item: 8.1.4.1; Source: Qualcomm Incorporated; Document for: Discussion/Decision; Date and Location: Apr. 11-15, 2016, Busan, Korea, consisting of 26 pages.

* cited by examiner a)

b)

a)

b)

NETWORK NODE, AND METHODS PERFORMED THEREBY FOR DETERMINING MODULATION SYMBOLS

CROSS-REFERENCE TO RELATED APPLICATIONS

This application is a Submission Under 35 U.S.C. § 371 for U.S. National Stage Patent Application of International Application Number: PCT/SE2020/051033, filed Oct. 26, 2020 entitled "NETWORK NODE, AND METHODS PERFORMED THEREBY FOR DETERMINING MODULATION SYMBOLS," the entirety of which is incorporated herein by reference.

TECHNICAL FIELD

The present disclosure also relates generally to a network node, and methods performed thereby for determining modulation symbols. The present disclosure further relates generally to a computer program product, comprising instructions to carry out the actions described herein, as performed by the network node. The computer program product may be stored on a computer-readable storage medium.

BACKGROUND

A wireless communications network may cover a geographical area which may be divided into cell areas, each cell area being served by a network node, which may be an access node such as a radio network node, radio node or a base station, e.g., a Radio Base Station (RBS), which sometimes may be referred to as e.g., gNB, evolved Node B ("eNB"), "eNodeB", "NodeB", "B node", Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc. . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations may communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

The standardization organization 3GPP is currently in the process of specifying a New Radio Interface called NR or 5G-UTRA, as well as a Fifth Generation (5G) Packet Core Network, which may be referred to as Next Generation (NG) Core Network, abbreviated as NG-CN, NGC or 5G CN. The so-called New Radio (NR) is the name for the radio interface of 5G. One of the characteristics of NR is that the frequency range goes to higher frequencies than LTE, e.g., above 6 GHz, where it is known to have more challenging propagation conditions, such as a higher penetration loss. To mitigate some of these effects, multi-antenna technologies such as beamforming may be massively used. Yet another NR characteristic is the use of multiple numerologies in DL and UL in a cell, or for a UE, and/or in different frequency bands. Yet another characteristic is the possibility to enable shorter latencies. NR architecture is being discussed in 3GPP. In the current concept, gNB denotes an NR BS. One NR BS may correspond to one or more transmission/reception points.

A particular type of network node may be a RAdio Detection and Ranging system (Radar). A radar may use radio waves to determine the location and speed of an object. A radar may comprise a transmitter which may transmit electromagnetic waves in the radio or microwaves domain and a receive. Radio waves, which may be pulsed or continuous, from the transmitter may reflect off the object and be picked up by the receiver, enabling a processor in the radar to derive information about the location and speed of the object. A particular type of radar is a monostatic radar.

Minimum Sensing Distance in a Monostatic Radar System

In a monostatic radar, receiver and transmitter may be understood to be collocated. If a transceiver does not support full duplex, the reflected and received pulse may be understood to need to arrive after transmission of the radar pulse is finalized. Otherwise the received signal may overlap in time with the transmitted pulse and reception may suffer, since full duplex is not supported. This may be understood to set a minimum sensing distance which depends on the radar pulse width, as illustrated in FIG. 1. FIG. 1 is a schematic representation of the timing relation between a radar pulse with a duration of width $T_{pulse}$ and its propagation time. The horizontal axis in all panels represents time, while the vertical axis indicates a magnitude of the transmitted pulse. In panel a), the bold box represents the transmitted pulse by the radar. In panel b), after a length of time $T_{p,1}$ has passed since transmission of the pulse was initiated, the transmitted pulse, represented by the bold box, arrives at an object located at distance $T_{p,1} \cdot c_0$. This distance is too close to the transceiver of the radar, since as depicted in panel c), the transmitted pulse creates a reflected pulse, depicted in panel c) as a striped box, which overlaps with the transmitted pulse at the receiver of the radar, and interference is caused. This is indicated by the striped box being received in time before the end of $T_{pulse}$, that is, while the pulse is still being transmitted by the transceiver of the radar. In contrast, panel d) depicts an example of an object located at a distance $T_{min} \cdot c_0 (T_{min} = T_{pulse}/2)$. The pulse arrives at the object at time $T_{p,min}$. As depicted in panel e), the object located at a distance $T_{min} \cdot c_0 (T_{min} = T_{pulse}/2)$ is far enough from the transceiver, since the reflected pulse, which is depicted in panel e) of FIG. 1 when it arrives back at the transmitter location, does not overlap with the transmitted pulse. As it may be concluded aligning in time panels a) and e) in FIG. 1, by the time the reflected signal caused from transmission of the pulse reaches the transceiver at time $2T_{pmin}$, the transceiver of the radar has already finished transmitting the full width of the $T_{pulse}$. This latter time point is denoted with a dashed vertical line. Hence, no overlap longer exists. As may be concluded from FIG. 1, when the reflecting object is at a distance of at least $T_{pulse}/2 \cdot c_0$, or the propagation time between radar transceiver and reflecting object is $T_p \geq T_{pulse}/2$, no overlap may occur anymore.

Discrete Fourier Transform Spread Orthogonal Frequency-Division Multiplexing (DFTS-OFDM)

Orthogonal Frequency-Division Multiplexing (OFDM) may be understood as a method of encoding digital data on multiple subcarrier frequencies whereby multiple closely spaced orthogonal subcarrier signals with overlapping spectra may be transmitted to carry data in parallel. Each subcarrier may be modulated with a modulation scheme, e.g., Quadrature Phase Shift Keying (QPSK), at a low symbol rate.

At very high frequencies, often a precoded version of OFDM may be used where the modulation symbols to be input into a modulator, also referred to as input modulation symbols, may first be passed through a Discrete Fourier Transform (DFT) precoder, e.g., of size M, and then OFDM modulated, for example with an Inverse Fast Fourier Transform (IFFT), e.g., of size N. The combination of a DFT precoder and an OFDM modulator (IFFT) may be understood as interpolation. The produced waveform may be understood to be single-carrier with low Peak to Average Power Ratio (PAPR) since the input modulation symbols may be only interpolated, in contrast to OFDM, which may be understood to produce a multi-carrier waveform. At very high frequencies, power amplifier output power and efficiency may be understood to become low. A low PAPR waveform, which may be understood to be power amplifier friendly, may be understood to thus be advantageous.

FIG. 2 is a schematic block diagram illustrating DFTS-OFDM. Input modulation symbols 21 are provided to a Serial-to-Parallel (S/P) component 22 of a modulator. The output parallel signal is a set of M input modulation symbols 23, which are provided to the DFT component 24 of the modulator. The DFT component of the modulator processes the input modulation symbols and determines the frequency-domain representation of size M of the input modulation symbols. The frequency-domain representation 25 of size M of the input modulation symbols may then be provided, after zero padding, to the IFFT component 26 of the modulator, which then processes them and outputs a new processed set of N modulation symbols 27, which may be provided to a Parallel-to-Serial (P/S) component 28. The output signal may thus be understood to be up-sampled and interpolated by a factor N/M relative to the input signal. The resulting signal may then be provided to a Cyclic Prefix (CP) component 29, which after processing, may provide an output waveform 30. An output waveform may be understood as a sequence of time-domain samples, each sample with a complex value.

OFDM Symbol Duration

OFDM may be understood to divide a given channel into narrower subcarriers. The spacing between them, referred to as subcarrier spacing, may be set to be such that the subcarriers may be orthogonal, and not interfere with one another despite the lack of guard bands between them. In an OFDM system such as that depicted in FIG. 2, the OFDM symbol duration excluding the CP, that is, $T_{symb}$, may be understood to be inversely proportional to the subcarrier spacing according to the following function: $T_{symb}=1/\Delta f$, wherein $\Delta f$ may be understood to denote the subcarrier spacing.

In a radar system using OFDM modulation $T_{symb}$ may also correspond to the minimum pulse width, in other words, the minimum pulse duration, that may be generated with subcarrier spacing $\Delta f$. In agreement to the description provided in relation to FIG. 1, for the minimum propagation time ($T_{min}$), that is, for the minimum duration of the transmitted pulse that may ensure a lack of overlap with a reflected signal reaching a receiver from an object, this relationship may be understood to imply that $T_{min}=T_{pulse}/2=T_{symb}/2=1/(2\cdot\Delta f)$. Hence, the minimum sensing distance may be understood to become $d_{min}=T_{min}\cdot c_0=c_0/(2\cdot\Delta f)$. That is, the minimum sensing distance may be understood to be inversely proportional to the subcarrier spacing.

NR may use subcarrier spacings in the range from 15 kHz to 120 kHz for the data channel. Subcarrier spacings of 15 and 30 kHz may be used below 7.125 GHz, subcarrier spacing 120 kHz may be used from 24.250 GHz to 52.600 GHz. For frequencies higher than 52.600 GHz, subcarrier spacings of 480, 960, and 1920 kHz may be considered. Table 1 lists the minimum sensing distance corresponding to subcarrier spacings 15, 30, 120, 480, 960, and 1920 kHz.

As it may be deduced from Table 1, the minimum sensing distances, even for the subcarrier spacings contemplated to be used in NR, are very large. These very large minimum distances prohibit the application of OFDM-based monostatic radar systems in many applications, e.g. such as vehicular-based radar to detect close pedestrians, bicycles.

TABLE 1

| Subcarrier spacing $\Delta f$ in kHz | Minimum sensing distance $d_{min}$ in km |
|---|---|
| 15 | 10.00 |
| 30 | 5.00 |
| 120 | 1.25 |
| 480 | 0.31 |
| 960 | 0.16 |
| 1920 | 0.08 |

SUMMARY

It is an object of embodiments herein to improve the minimum sensing distances of radar systems in a wireless communications network. It is a particular object of embodiments herein to improve the minimum sensing distances of radar systems in a wireless communications network by improving the determination of modulation symbols to be provided to a modulator.

According to a first aspect of embodiments herein, the object is achieved by a method, performed by a network node. The network node comprises a modulator based on DFTS-OFDM. The method is for determining modulation symbols. The network node determines modulation symbols to be input into the modulator. Of a first set of the modulation symbols corresponding to a duration of a DFTS-OFDM symbol, only a first subset of modulation symbols are set to first values of magnitude exceeding zero by a first threshold. The modulation symbols in the first subset are determined to have a first contiguity arrangement. The network node then initiates providing the determined modulation symbols to the modulator.

According to a second aspect of embodiments herein, the object is achieved by the network node, for determining modulation symbols. The network node is configured to comprise the modulator configured to be based on DFTS-OFDM. The network node is further configured to determine the modulation symbols to be input into the modulator. Of the first set of the modulation symbols configured to correspond to the duration of a DFTS-OFDM symbol, only the first subset of modulation symbols are configured to be set to first values of magnitude exceeding zero by the first threshold. The modulation symbols in the first subset are configured to be determined to have a first contiguity arrangement. The network node is further configured to initiate providing the modulation symbols configured to be determined to the modulator.

According to a third aspect of embodiments herein, the object is achieved by a computer program, comprising instructions which, when executed on at least one processor, cause the at least one processor to carry out the method performed by the network node.

According to a fourth aspect of embodiments herein, the object is achieved by a computer-readable storage medium, having stored thereon the computer program, comprising instructions which, when executed on at least one processor, cause the at least one processor to carry out the method performed by the network node.

By the network node determining the modulation symbols, so that only the first subset of modulation symbols are set to first values of magnitude exceeding zero by the first threshold, and then providing the determined modulation symbols as input to the modulator, the network node enables its modulator to process the modulation symbols and generate an output waveform comprising a pulse having an effective duration shorter than the OFDM symbol duration. This may enable that transmission of the generated pulse may end before the end of the duration of one OFDM symbol, and therefore to receive any reflected signal resulting from the transmission of the pulse, to be received in the absence of interference from the transmitted pulse, which may in turn enable to achieve a shorter sensing distance. That is, the determined modulation symbols by the network node may enable to sense objects located at a shorter distance from a transmitter than existing methods.

BRIEF DESCRIPTION OF THE DRAWINGS

Examples of embodiments herein are described in more detail with reference to the accompanying drawings, and according to the following description.

DETAILED DESCRIPTION

Certain aspects of the present disclosure and their embodiments address one or more of the issues with the existing methods and provide solutions to the challenges just discussed. In general terms, embodiments herein may be understood to be related to radar pulses for OFDM-based systems.

As explained in the background section, OFDM numerologies that may be typically used in communications may lead to rather long OFDM symbol durations and thus large minimum sensing distances in radar based sensing applications. An DFTS-OFDM method is disclosed herein which may enable to create pulses shorter than the OFDM symbol duration which may in turn be understood to reduce the minimum sensing distance.

As a generalized overview, embodiments herein may be understood to enable, for DFTS-OFDM-based systems, to map modulation symbols of the desired radar pulse only to a contiguous fraction of DFTS-OFDM input modulation symbols. This may be understood to create at the output an interpolated version of the input which may be localized in time to the same fraction of the OFDM symbol duration as the input signal. Since the energy may as a result be largely concentrated to a time duration less than the symbol duration, the transceiver of a radar system may switch earlier between transmission and reception, that is, before the OFDM symbol ends. The radar pulse that may be generated may therefore be shorter than the OFDM symbol duration and hence enable to reduce the minimum sensing distance.

Several embodiments and examples are comprised herein. It should be noted that the embodiments and/or examples herein are not mutually exclusive. Components from one embodiment or example may be tacitly assumed to be present in another embodiment or example and it will be obvious to a person skilled in the art how those components may be used in the other exemplary embodiments and/or examples.

Figure 1:
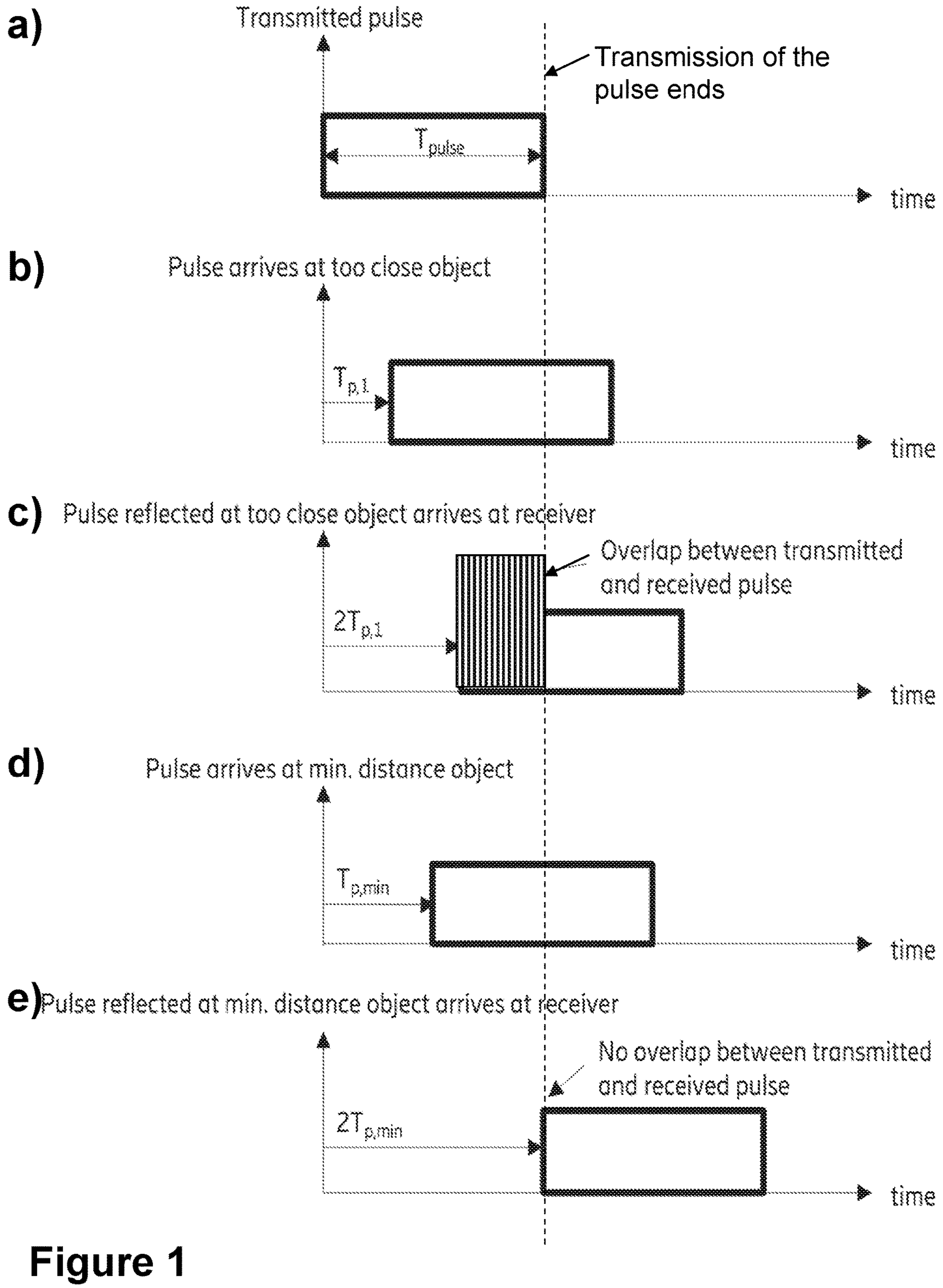
FIG. 1 is a schematic diagram illustrating the minimum sensing distance of a radar system.
Figure 2:
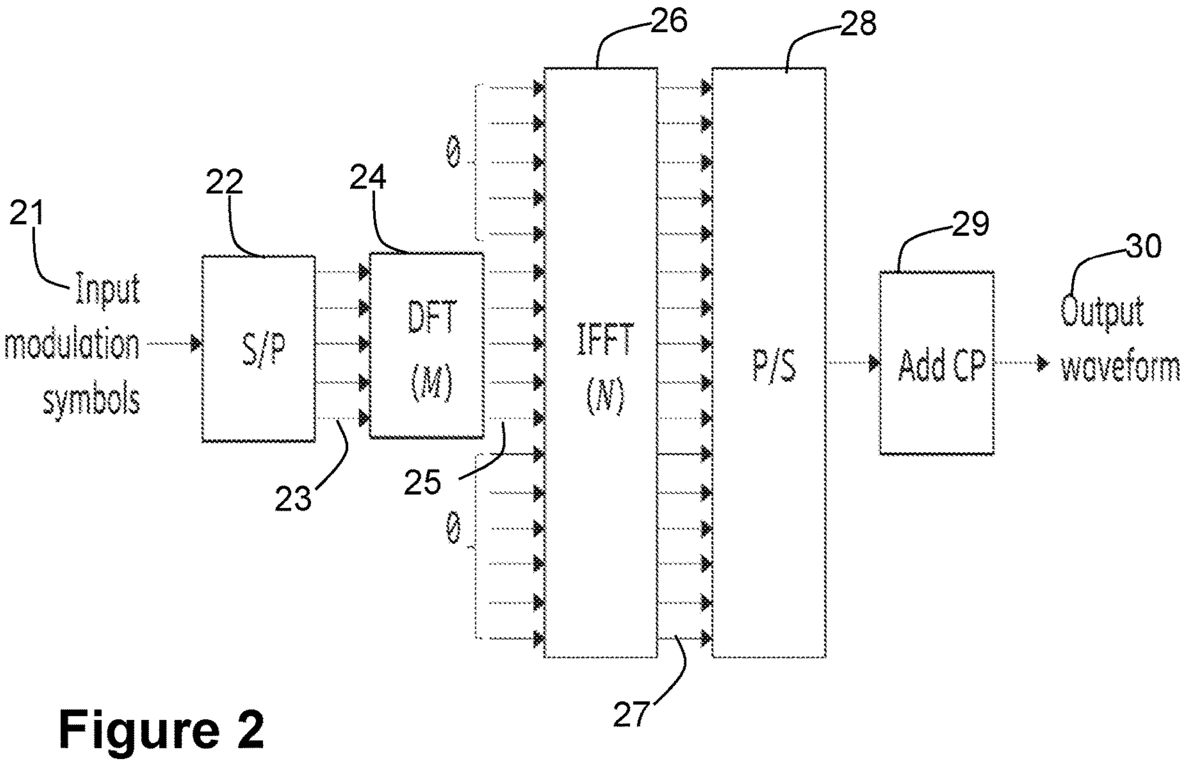
FIG. 2 is a schematic diagram illustrating DFTS-OFDM.
Figure 3:
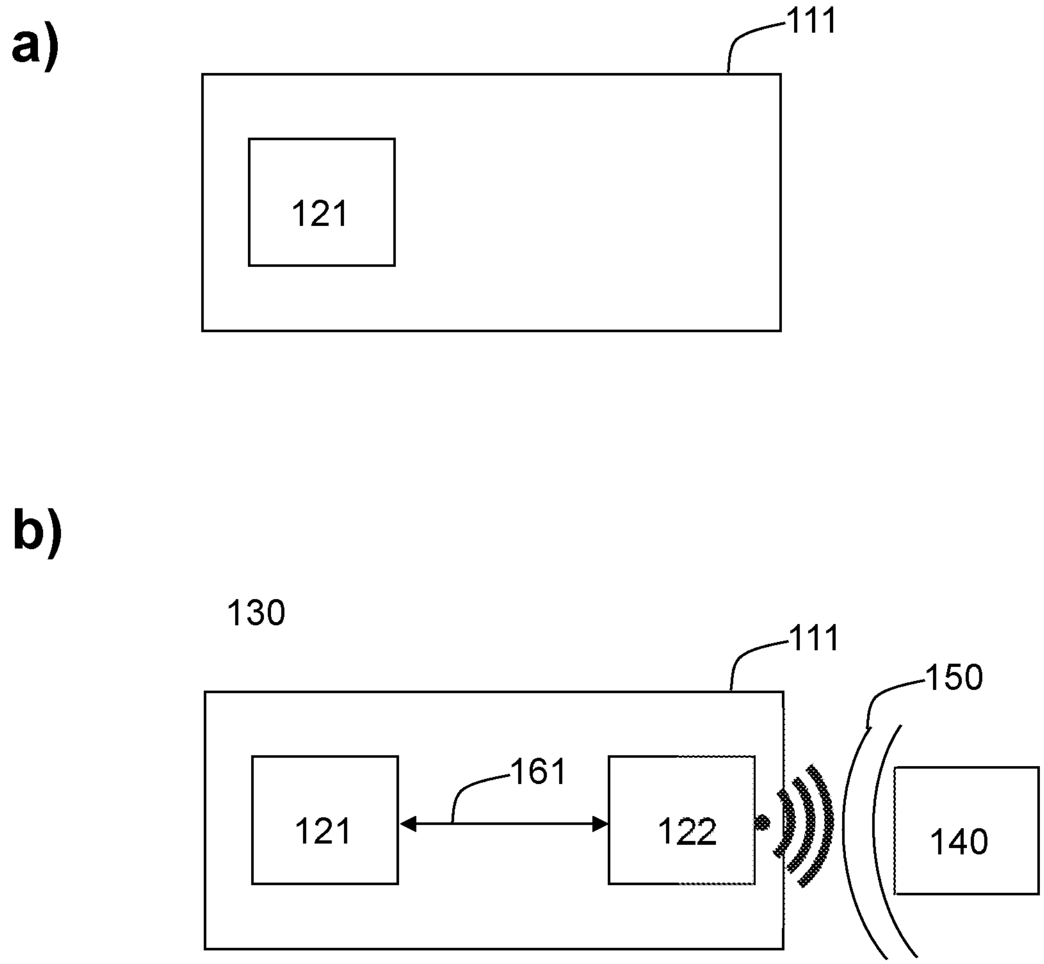
FIG. 3 is a schematic diagram illustrating a network node, according to embodiments herein.

FIG. 3 depicts two non-limiting examples, in panel a) and panel b), respectively, of a network node 111 in which embodiments herein may be implemented. The network node 111 may be understood as a computer system comprising a modulator 121. The modulator 121 may be understood to be capable of processing input modulation symbols and output time-domain sequence of complex numbers. This time-domain sequence may then be able to be converted into a time-continuous analog signal using a Digital to Analog Converter (DAC). This analog signal may then in turn be able to be mixed, e.g., multiplied, with a carrier signal. The modulator 121 may comprise a DFT component. The modulator 121 may further comprise an IFFT component. The modulator 121 may comprise other components, such as an S/P component and/or a P/S component. In some embodiments, the network node 111 may be an independent component, as depicted in the non-limiting example of panel a) in FIG. 3, for example, the network node 111 may be a (DFTS-)OFDM modulator. In other embodiments, the network node 111 may be comprised in or be a radio network node, such as in the non-limiting example depicted in panel b) of FIG. 3. The network node 111 may be, for example, a digital unit or a radio unit component comprised in a radio network node. The network node 111 may be a transmission point, such as a radio base station, for example a gNB, an eNB, an eNodeB, or a Home Node B, an Home eNode B or any other network node capable of serving a wireless device, such as a user equipment or a machine type communication device, in the wireless communications network 130. In particular embodiments, the network node 111 may be capable of radar operation, that is, the network node 111 may be a radar. The network node 111 may also comprise a transmitter 122. The transmitter 122 may be able to process a waveform or carrier signal with another signal that may comprise information to be transmitted, and then transmit the output waveform into an air carrier. In some particular examples, the transmitter 122 may be comprised in a transceiver. That is, a component capable of also receiving radio signals and convert the information carried by them to a usable form.

In typical scenarios, depicted in FIG. 3, the network node 111 may be co-located, or be the radio network node. In other examples, which are not depicted in FIG. 3, the network node 111 may be a distributed node, such as a virtual node in the cloud, and may perform at least some of its functions on the cloud, or partially, in collaboration with a radio network node.

As depicted in the non-limiting example of panel b) in FIG. 3, the network node 111 may be comprised in a wireless communications network 130, sometimes also referred to as a wireless communications system, cellular radio system, or cellular network, in which embodiments herein may be implemented. The wireless communications network 130 may typically be a 5G system, 5G network, or Next Gen System or network, or a newer system supporting similar functionality. The wireless communications network 130 may support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system. The wireless communications network may also be understood as a non-cellular system, comprising network nodes which may serve receiving nodes, such as wireless devices, with serving beams. This may be a typical case, e.g., a in a 5G network.

The wireless communications network 130 may cover a geographical area which may be divided into cell areas, wherein each cell area may be served by a network node, although, one radio network node may serve one or several cells. In the non-limiting example depicted in panel b) of FIG. 3, the network node 111 may serve a cell. The network node 111 may be of different classes, such as, e.g., macro eNodeB, home eNodeB or pico base station, based on transmission power and thereby also cell size. The network node 111 may support one or several communication technologies, and its name may depend on the technology and terminology used. In 5G/NR, the network node 111, which may be referred to as a gNB, may be directly connected to one or more core networks, which are not depicted in FIG. 3.

A plurality of objects may be located in the wireless communication network 130, whereof an object such as a first object 140, is depicted in the non-limiting example of panel b) in FIG. 3. The object 140 may be able to reflect at least some of the waveforms transmitted by the network node 111 as a reflected signal, such as a first reflected signal 150 that the network node 111, e.g., via a receiver or transceiver, may be able to receive.

The modulator 121 may be configured to communicate with the transmitter 122 of the network node 111 over a first link 161, e.g., a wired, wireless or infrared link.

It may be understood that the network node 111 may be comprised in another structure, for example, a vehicle, as long as it may be able to perform its functions.

In general, the usage of "first", "second", "third" and/or "fourth" herein may be understood to be an arbitrary way to denote different elements or entities, and may be understood to not confer a cumulative or chronological character to the nouns they modify.

Embodiments of a method performed by the network node 111, will now be described with reference to the flowchart depicted in FIG. 4. The method may be understood to be for determining modulation symbols. The network node 111 comprises the modulator 121. The modulator 121 is based on DFTS-OFDM.

In some examples, the network node 111 may operate in the wireless communications network 130.

In some embodiments, all the actions may be performed. In some embodiments, one or more actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 4, optional actions are indicated with dashed lines. Some actions may be performed in a different order than that shown in FIG. 4.

Action 401

In this Action 401, the network node 111 determines modulation symbols to be input into the modulator 121, which may be also be referred to herein as input modulation symbols. Of a first set of the modulation symbols corresponding to a duration of a DFTS-OFDM symbol, only a first subset of modulation symbols are set to first values of magnitude exceeding zero by a first threshold. The modulation symbols in the first subset are determined to have a first contiguity arrangement. A non-limiting example of the determined modulation symbols is depicted in panel b) of FIG. 5, which will be described later. In panel b) of FIG. 5, the first subset is denoted as L.

Determining may be understood as calculating, deriving, generating, estimating, or similar.

The modulation symbols to be input into the modulator 121, or input modulation symbols, may be understood as complex-valued symbols.

The values of magnitude may be understood to define the shape or envelope any resulting output pulse may have.

The first contiguity arrangement may be selected based on a selected sensing distance. A contiguity arrangement may be understood to refer to an arrangement, that may be chosen or configured, that may determine how the modulation symbols may be organized in terms of being contiguous. Contiguous may be understood to refer to being adjacent to each other in the time domain.

In some embodiments, the first contiguity arrangement may be one of the following options. According to a first option, the first contiguity arrangement may be that at least half of the modulation symbols in the first subset may be adjacent to another modulation symbol in the first subset. According to a second option, the first contiguity arrangement may be that all the modulation symbols in the first subset may be contiguous. Other examples may have a first contiguity arrangement in between these two arrangements, e.g., at least 80% of the modulation symbols in the first subset may be adjacent to another modulation symbol in the first subset.

The first threshold may be set so that the generated waveform may have its energy concentrated over a time span that may correspond to the L samples. Concentrated may mean, e.g., 90%, 99% of the energy, or another high value. The time span, or span, may be understood to refer to a duration from an earliest element of a subset, e.g., the first subset, to a last element of the subset, even if the elements in the subset may not be contiguous.

By the network node determining the modulation symbols, so that only the first subset of modulation symbols are set to first values of magnitude exceeding zero by the first threshold, and then providing the determined modulation symbols as input to the modulator, the network node enables its modulator to process the modulation symbols and generate an output waveform comprising a pulse having a duration shorter than the OFDM symbol duration. This may enable transmission of the generated pulse to end or be stopped before the end of the duration of one OFDM symbol, and therefore to receive any reflected signal resulting from the transmission of the pulse, to be received in the absence of interference from the transmitted pulse, which may in turn enable to achieve a shorter sensing distance. That is, the determined modulation symbols by the network node may enable to sense objects located at a shorter distance from a transmitter than existing methods.

In some embodiments, any symbols in the first set of modulation symbols excluded from the first subset of modulation symbols may be set to second values of magnitude being zero or larger than zero and smaller than a second threshold. The second threshold may be smaller than the first threshold. In other words, the symbols in the first set of modulation symbols falling outside of the first subset of modulation symbols may be set to zero, as the non-limiting example of panel b) in FIG. 5, or to a value of magnitude not significantly different than zero. The second threshold may be, statistically, significantly different, e.g., smaller, than the first threshold. Setting the modulation symbols in the first set not included in the first subset to zero or close to zero values of magnitude may enable the network node 111 to control even further the duration of the pulse that the modulator 121 may generate, so that it may have an even shorter duration, and avoid even more interference between a transmitted pulse and any reflected signal resulting from it.

In some embodiments, a second set of symbols may be output by the modulator 121 after processing the first set of modulation symbols. The second set of symbols may correspond to a duration of an DFTS-OFDM symbol. A first span of the first subset may be determined based on a desired second span of a second subset of symbols, out of the second set of symbols, that may have to have second values of magnitude exceeding zero by a third threshold. The third threshold may be the same or similar to the first threshold, although not necessarily. The desired second span may be understood to depend on when it may be desired that the span of the second subset may end, so that the transmission of the second subset may be considered concluded and the transmitter 122 may be switched to a receiver.

The expression after processing in "after processing the first set of modulation symbols" may mean, in some examples, after applying an IFFT operation.

In some embodiments, transmission of the second subset of symbols may enable the network node 111 to receive the reflected signal 150 from the object 140 located at a distance of the transmitter 122 of the network node 111. The second span may be based on a desired value of the distance, e.g., a minimum desired value of the distance. That is, the desired second span may be chosen based on when it may be desired that the second subset may end, so that the transmission (TX) of the second subset may be considered concluded and the transmitter 122 may be switched to the receiver in order to receive the any reflected signal, such as the first reflected signal 150. In other words, the desired second span may be understood to be chosen based on the desired sensing distance.

The first contiguity arrangement may be selected so that transmission of the second subset of symbols may enable the network node 111 to receive the reflected signal 150 from the object 140 located at a distance of the transmitter 122 of the network node 111.

In some embodiments, the symbols in the second subset of symbols may have a second contiguity arrangement wherein one of: a) at least half of the modulation symbols in the second subset of symbols may be adjacent to another modulation symbol in the second subset of symbols, and b) all the modulation symbols in the second subset of symbols may be contiguous. Any symbols in the second set of symbols excluded from the second subset of symbols may be set to have third values of magnitude being zero or larger than zero and smaller than a fourth threshold. The fourth threshold may be the same or similar to the second threshold, although not necessarily.

Other examples may have a second contiguity arrangement in between these two arrangements, e.g., at least 80% of the modulation symbols in the second subset may be adjacent to another modulation symbol in the second subset.

The third threshold may be, statistically, significantly different than the fourth threshold. The second subset may be understood to be the "main pulse". A non-limiting example of the second subset is depicted in panel c) of FIG. 5, as the part of the depicted output waveform comprised between and excluding the circles.

In some embodiments, the determining in this Action 401 may comprise setting the first subset of modulation symbols at an offset from a beginning of the DFTS-OFDM symbol duration. A DFTS-OFDM modulator such as the modulator 121 may generate a cyclic, periodic, waveform. If the non-zero values of the first subset were to be the first, or last, modulation symbols of the waveform, the ringing may be substantial at the end, or the beginning, of the OFDM symbol. By shifting the first subset inwards with the offset, the strongest ringing may occur directly adjacent to the main pulse thereby concentrating more energy in and around the main pulse, which may be understood to result in a shorter duration containing most energy, that is, in a shorter pulse. Ringing may be understood to refer to a signal oscillation. By setting the first subset of modulations symbols at the offset, the network node 111 may be enabled to generate an output waveform based on the first set, with reduced ringing outside the main pulse, thereby avoiding interference between transmission of the pulse and reception of the first reflected signal 150.

As a summary of the foregoing, Action 401 may enable the network node 111 to design modulation symbols to be input to the modulator 121 in order to generate short pulses using DFTS-OFDM. The pulses, which may be understood to be shorter than the duration of an ODFM symbol, may enable the network node 111 to switch between TX and RX earlier, and thereby reduce the sensing distance of the first object 140.

Action 402

In this Action 402, the network node 111 initiates providing the determined modulation symbols to the modulator 121. That is, the network node 111 may provide itself or trigger or enable another node to provide, the determined modulation symbols as input, to the modulator 121, for further processing. This latter case may correspond to a scenario wherein the network node 111 may be a distributed node which may perform Action 401 in the cloud and may then send the determined modulation symbols to a radio network node.

The modulation symbols that may be input to the DFT may for example be a binary sequence, such as an m-sequence, Gold codes, Golay codes, complementary Golay codes, etc. that may be mapped to suitable modulation symbols, such as Binary Phase Shift Keying (BPSK), pi/2 BPSK, QPSK. Another option may be to map the elements of a sequence, e.g., a complex valued sequence to the modulation symbols. The sequence may for example be a chirp sequence, such as a Zadoff-Chu sequence.

Sequences with good properties may be often limited to certain lengths, e.g., a Zadoff-Chu sequence may often be limited to prime numbers, an m-sequence may have length $2^p-1$, etc. To generate a desired sequence length, the sequence may be truncated, cyclic extended, or padded with some values, e.g., edge sample of the sequence.

Action 403

In some embodiments, the modulator 121 may be further based on an IFFT operation. In some of such embodiments, the network node 111 may, in this Action 403, process the determined modulation symbols by a) DFT precoding the determined modulation symbols and b) cyclic extending the determined and DFT-precoded modulation symbols prior to applying the IFFT operation.

Cyclic extending may be understood as duplicating information arranged to be transmitted on one set of frequencies, e.g., subcarriers, to another set of frequencies, e.g., subcarriers. For example, the processing in this Action 403 may comprise to cyclic extend the subcarriers, that is, copy subcarriers from one end of the allocated frequency spectrum to the other, e.g. copy the lowest subcarrier(s) and place them above the highest subcarrier. This operation may either be applied to one end or both ends of the subcarriers.

By processing the determined modulation symbols to cyclic extend the determined and DFT-precoded modulation symbols prior to applying the IFFT operation, the network node 111 may be enabled to have information transmitted over weighted subcarriers occur on two subcarriers. This may then enable any receiver of the transmission to then combine both subcarriers, and by that improve performance. Subcarriers that may not be weighted, e.g., that may be. multiplied by 1, may typically not be cyclic extended.

Action 404

In some embodiments, the modulator 121 may be further based on an IFFT operation. A frequency-domain filter may be applied between DFT and IFFT, which may be understood to be 1 at allocated subcarriers, and 0 otherwise. This filter may be understood to be very steep in frequency-domain, as it may jumps from 0 to 1, and such a non-smooth behavior in the frequency-domain may lead to much ripple in the time-domain, thereby risking to extend any resulting transmitted pulse in the time domain, which may be understood to be undesirable in order to reduce the sensing distance of the network node 111. In order to address this, in this Action 404, the network node 111 may process the determined modulation symbols by applying DFT precoding, and multiplying a first output sample of the DFT-precoded modulation symbols by a first factor and a second output sample of the DFT-precoded modulation symbols by a second factor. The first factor may be a different from the second factor. The application of DFT precoding and the multiplication in this Action 404 may be understood to precede the IFFT operation.

Multiplying the first output sample of the DFT-precoded modulation symbols by the first factor and the second output sample of the DFT-precoded modulation symbols by the second factor may be understood as frequency-domain windowing. An output sample may be understood as an output value of the DFT operation.

A window element-wise may be understood to multiply its input with the window. For example, given a vector X_i (i=0, . . . , N−1), which may be the DFT precoded and potentially cyclic extended input modulation symbols, and a window W_i (i=0, . . . , N−1), the signal after windowing operation may be Y_i=X_i*W_i. Typical frequency-domain windows may be understood to have smooth slopes and may be flat in the center part. Examples of window functions may be raised cosine window, root raised cosine window, Hamming window, Hanning window, Blackman Planck-taper window, Tukey window.

The first factor and the second factor may be different elements of W_i, e.g., W_m and W_n, with m unequal n.

By shaping the subcarriers in the frequency-domain in this Action 404, the filter between the DFT-precoder and the IFFT operation may transition smoothly from a small value, that is, the lower end of the allocated subcarriers, to one, and maybe remain for a while at one, and then decay towards the upper end of the subcarrier. This smooth frequency-domain behavior may to lead to less ripple in the time domain. In turn, the network node 111 may be enabled to generate an output waveform based on the first set, with reduced ringing outside the main pulse, avoiding interference between transmission of the pulse and reception of the reflected signal 150.

At the same time, by multiplying a subcarrier with a value smaller than 1, information on that subcarrier may be more difficult to recover at the receiver, since it may be transmitted and received with less power. In order to address this, in some embodiments, the multiplying in this Action 404 may be performed on the cyclic extended and DFT-precoded modulation symbols obtained in Action 403. If the subcarriers are cyclic extended prior the shaping it may be possible for the network node 111 to choose the shaping and cyclic extension in a way that a subcarrier that may be weighted down, e.g., by weight w1<1, at the lower end of the spectrum, may also occur, by cyclic extension, at the upper end of the spectrum, weighted by w2<1. Typically, it may be possible to select that w1+w2=1 or w1^2+w2^2=1. With cyclic extension, information that may be transmitted over weighted subcarriers may occur on two subcarriers, and the receiver may therefore be able combine both subcarriers, and by that, improve performance. Subcarriers that are not weighted (i.e. multiplied by 1) are typically not cyclic extended.

In a multi-user environment, different users may be assigned different frequencies, that is, the output of the DFT precoder, e.g., cyclic extended and frequency-domain windowed, may be mapped to different subcarriers. Another alternative may be to assign different users to different sequences, e.g. different m-sequences or different Zadoff-Chu sequences or different cyclic shifted Zadoff-Chu sequences. Assigning different frequencies and/or sequences to different users may be understood to reduce interference between users.

Action 405

In some of the embodiments wherein the modulator 121 may be further based on the IFFT operation, the network node 111 may, this Action 405, process an output waveform of the modulator 121 after IFFT operation, by selecting a third subset of symbols. The third subset of symbols may be selected according to one of the following two options. According to a first option, the third subset of symbols may be selected out of the second subset of symbols and spanning a complete span of the second subset of symbols. According to a second option, the third subset of symbols may be selected out of the second set of symbols and spanning a third duration exceeding the span of the second subset of symbols and being shorter than the duration of one DFTS-OFDM symbol.

The duration of the third subset of symbols may be centered around the span of the second subset of symbols. That is, extended symmetrically on both sides of the span of the second subset of symbols. Action 405 may be understood as time-domain windowing. Therefore, to process the output waveform in this Action 405 may be understood as multiplying the time-domain samples with a window function. Examples of window functions may be raised cosine window, root raised cosine window, Hamming window, Hanning window, Blackman Planck-taper window, Tukey window. A smooth window leads to better out-of-band properties of the windowed output signal.

The time-domain window performed according to Action 405, that is multiplying the time-domain samples with the window function, may be applied to the output of the IFFT to truncate the waveform to the desired duration with non-zero samples, as indicated by the bold dashed line in FIG. 6, which will be described later. A typical window may be smooth, potentially rather flat in the part overlapping the pulse, plus potentially some time before and after, and smoothly decay towards the edges. In the simplest case, the decay may be a vertical slope, that is, the overall window may be a rectangular window overlapping the pulse, plus potentially some time before and after. Other decay functions may be smoother.

By processing the output waveform of the modulator 121 after IFFT operation by selecting the third subset of symbols, the network node 111 enables to output the waveform with reduced ringing outside the main pulse, avoiding interference between transmission of the pulse and reception of the reflected signal 150.

Action 406

In this Action 406, the network node 111 may transmit, by the transmitter 122 of the network node 111, an output waveform based on the determined modulation symbols in the first set.

The transmitting in this Action 406 may be performed after application of the IFFT operation.

In some embodiments, the output waveform may be transmitted after having DFT precoded the determined modulation symbols and cyclic extended the determined and DFT-precoded modulation symbols prior to applying the IFFT operation, as described in Action 403.

In some embodiments, the output waveform may be transmitted after having applied DFT precoding, and having multiplied the first output sample of the DFT-precoded modulation symbols by the first factor and the second output sample of the DFT-precoded modulation symbols by the second factor, as described in Action 404.

In some embodiments, the output waveform may be transmitted after having processed the output waveform of the modulator 121 after IFFT operation, by selecting the third subset of symbols, as performed in Action 405.

In other words, the transmitting in this Action 406 may be further based on any of the processing Actions 403, 404 and 405, which may have been optionally performed, individually or cumulatively. In particularly preferred embodiments, Actions 401, 403, 404 and 405 may be performed sequentially, resulting in the output waveform being transmitted in this Action 406.

By transmitting the output waveform based on the determined modulation symbols in the first set, the network node 111 enables the reception of the reflected signal 150 avoiding interference with the transmission of the pulse, and therefore, enabling that the sensing distance of the object 140 may be shorter.

Action 407

In this Action 407, the network node 111 may initiate determining a location of the first object 140 located at a first distance from the network node 111. The initiating determining in this Action 407 of the location may be based on a received reflected signal, that is, the first reflected signal 150, from the first object 140 based on the transmitted output waveform in Action 406.

Initiating determining may be understood as determining, calculating, estimating, deriving itself, or enabling or triggering another node to determine, calculate, estimate or derive it. This latter case may correspond to a scenario wherein the network node 111 may be a distributed node which may enable the determination of the location of the first object to be performed by another node in the cloud, after the first reflected signal 150 may have been received by the network node 111.

By initiating the determination of the location of the first object, based on the received first reflected signal based in turn on the transmitted output waveform, the network node 111 enables the sensing distance of the network node 111 to be shorter, that is, it enables to detect the location of the first object 140 even when the object is located at a close distance from the network node 111, avoiding interference with the transmission of the pulse.

Figure 5:
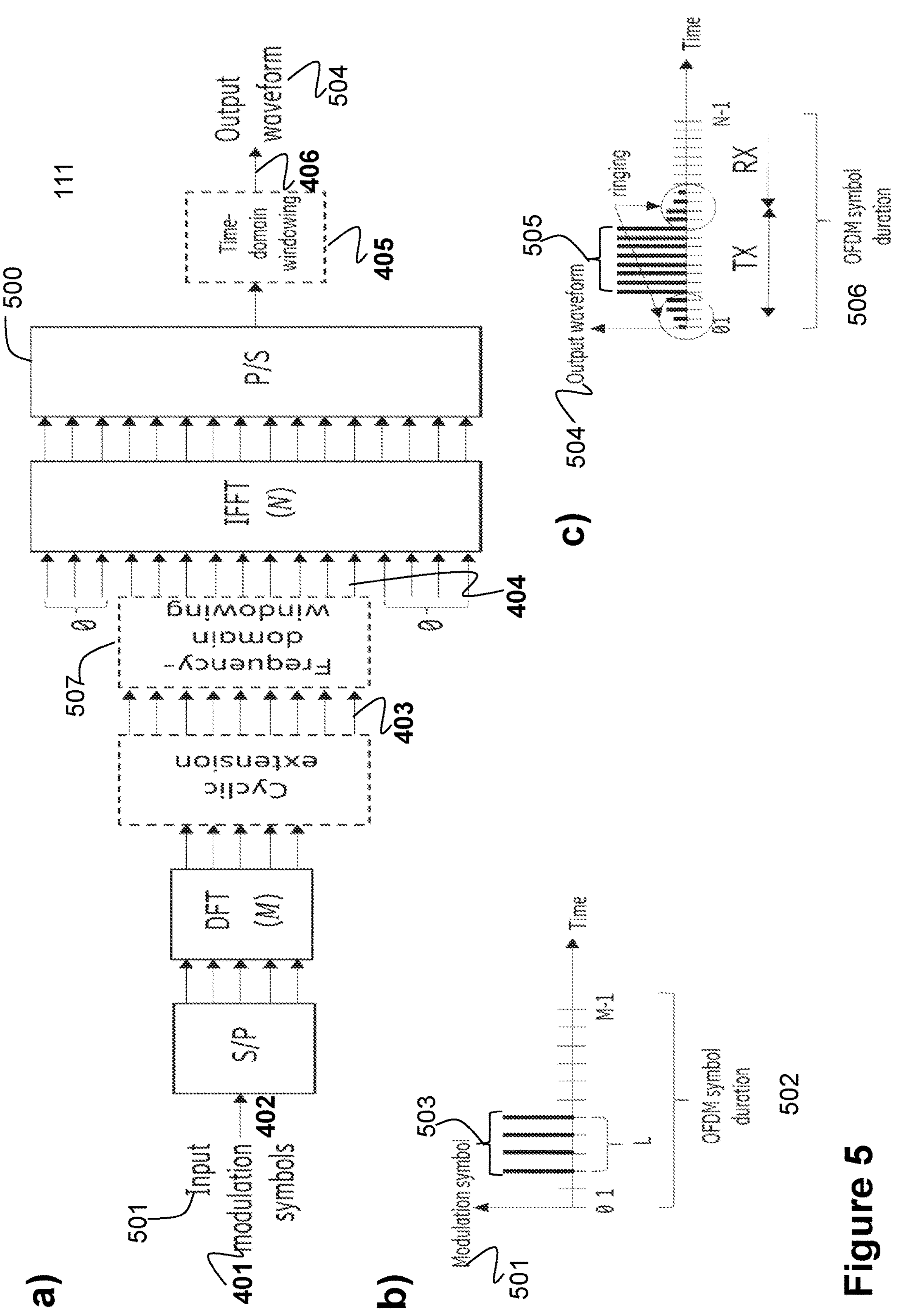
FIG. 5 is a schematic diagram illustrating embodiments of a network node, according to embodiments herein.

FIG. 5 is a schematic block diagram illustrating, in panel a), a non-limiting example of the network node 111 according to embodiments herein, comprising the modulator 121 as a DFTS-OFDM modulator. The components of the modulator 121 described earlier are not described again. In the particular example of FIG. 5, the modulator 121 further comprises a Parallel to Serial (P/S) component 500, which may be understood to convert now a vector output by the IFFT into a serial time stream of individual symbols. Panel b) is a schematic diagram illustrating a non-limiting example of the modulation symbols 501 determined in Action 401, particularly showing the determined first set of the modulation symbols 502 and the first subset of the modulation symbols 503. Panel c) is a schematic diagram illustrating a non-limiting example of the output waveform 504 that may be generated by the modulator 121 based on the first set of modulation symbols 502 determined in Action 401. Panel c) particularly shows the second subset of symbols 505 and the second sub of symbols 506. As depicted in panel a), the input modulation symbols 501 in the first set of modulation symbols 502, are, as determined according to Action 401, only significantly non-zero over a contiguous fraction of the input modulation symbols, corresponding to the first subset of modulation symbols 503. Since DFTS-OFDM may be understood to interpolate the input waveform, the generated output waveform 504, may be understood to have its energy also concentrated to the same fraction of the OFDM symbol duration, that is, the second subset of symbols 505, and just some ringing, from the interpolation, outside this interval in the second set of symbols 506. The ringing is indicated in panel c) of FIG. 5 by the circled samples. As depicted in panel a), the remaining input modulation symbols in the first set of modulation symbols 502 may be either zero or may be optimized to minimize some metric related to the output waveform 504. Examples of this metric may be to minimize the energy contained in the ringing, to minimize the maximum magnitude of the ringing, to maximize the ratio of energy contained in the significantly non-zero part of the pulse, that is, the first subset of modulation symbols 503, and the ringing. FIG. 5 also contains some optional blocks in the modulator 121 of the network node 111, which are indicated with dashed lines. The frequency-domain window block 507 may apply a frequency-domain window as described in Action 404, to the subcarriers, that is, multiply the subcarriers with the window function. This may be understood to reduce the ringing outside the main pulse of the second subset of symbols 505. Another variant may be to first, according to Action 403, cyclic extend the subcarriers, that is, copy subcarriers from one end to the other, e.g. copy the lowest subcarrier(s) and place them above the highest subcarrier. This operation may either be applied to one end or both ends of the subcarriers. This operation together with frequency-domain windowing that may be performed according to Action 404, may be understood to also help to reduce the ringing. As may be appreciated from panel c), the second subset of symbols 505 in the output waveform has a duration that is shorter than the duration of one ODFM symbol. Therefore, the transmitter (TX) 122 of the network node 112 may be switched off before the ODFM symbol is over, and the receiver (RX) of the network node 111 may be switched on, to receive the first reflected signal 150 from the first object 140. By the second subset of symbols 505 having been already transmitted at the switch, the full pulse may be transmitted without causing interference with the first reflected signal 150. As explained earlier the transmitter 122 may be comprised in a transceiver of the network node 111, which may also be able to perform the receiver operation.

Figure 6:
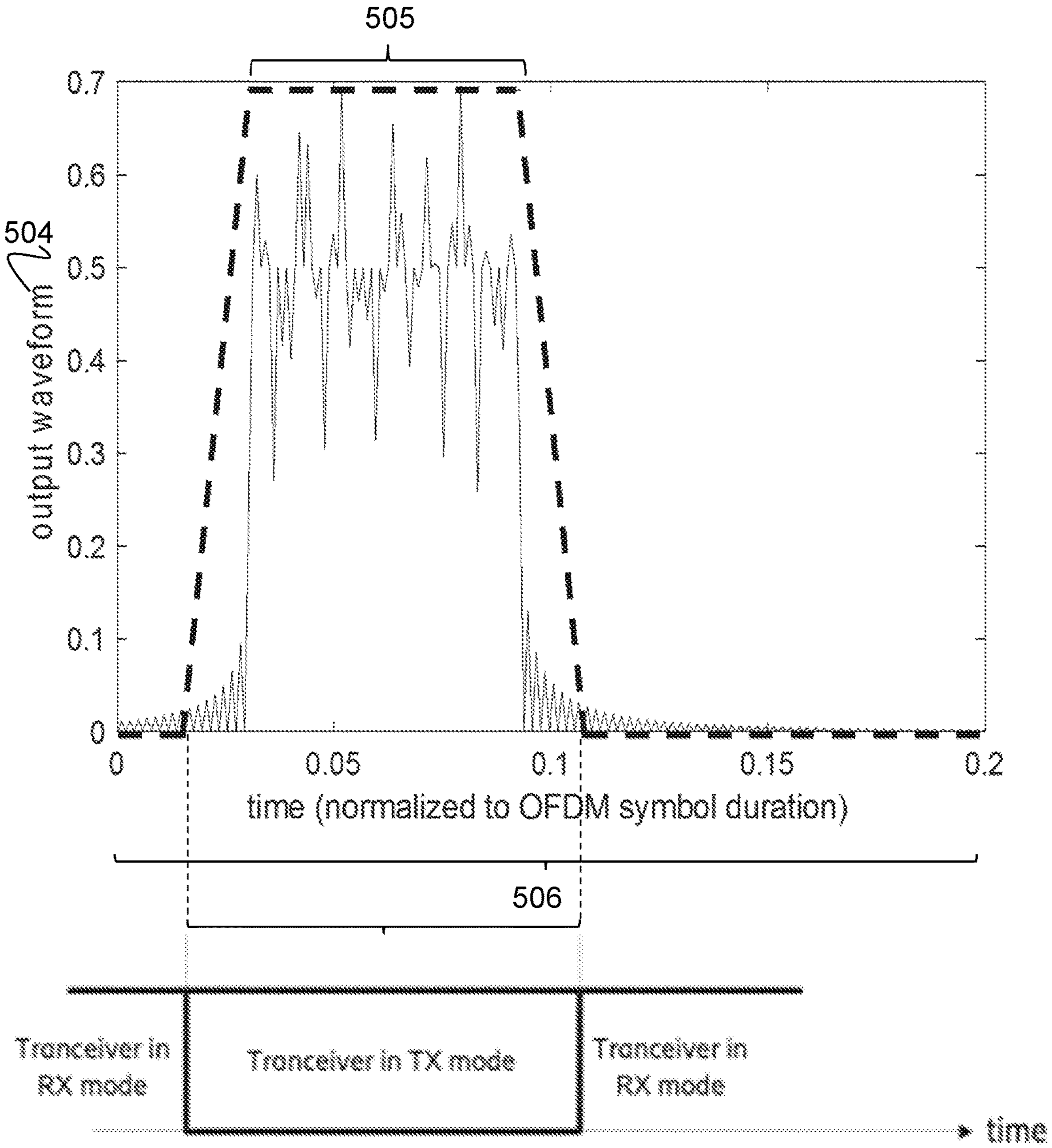
FIG. 6 is a schematic diagram illustrating aspects of an output waveform from a network node, according to embodiments herein.

FIG. 6 shows a non-limiting example of the output waveform 504 that may be generated by the network node 111 according to embodiments herein. The horizontal axis represents time, normalized to one OFDM symbol duration. The represented points of the waveform correspond to the second set of symbols 506, comprising the second subset of symbols 505. To generate the non-limiting example output waveform 504 depicted in FIG. 6, the OFDM size N is set to 1024, and the DFT size to M=512. Only L=32 modulation symbols of the input modulation symbols, that is, only the L modulation symbols of the first subset of modulation symbols 503, have been set to non-zero, the remaining M−L=480 modulation symbols in the first set 502 have been set to zero. The L non-zero samples are in this case not placed the beginning, but somewhat shifted into the symbol duration, according to the offset described in Action 401. For embodiments wherein the transmitter 122 may be comprised in a transceiver, the transceiver may be understood to need to be in transmission (TX) mode during at least some part of the created main pulse, that is the second subset of symbols 505, preferably over the complete span of the main pulse plus potentially some time before and after, as the example depicted in panel c) of FIG. 5 and in the example depicted in FIG. 6. The truncation of the output waveform 504, which in total may still have the length of one OFDM symbol duration, even though only a fraction, that is, the third subset of symbols 601, may contain the majority of energy, may be done by just switching the transceiver from transmit to receive. Alternatively, a time-domain window performed according to Action 405, that is by multiplying the time-domain samples with the window function, may be applied to the output of the IFFT to truncate the waveform to the desired duration with non-zero samples. The bold dashed line is an optional time-domain window performed according to Action 405, by selecting the third subset of symbols 601.

One or more advantages of embodiments herein may be any of the following. Embodiments herein may enable to generate radar pulses that may be shorter than the OFDM symbol duration. From Table 1, it may be appreciated that the symbol durations for OFDM numerologies which may be commonly used for communication may lead to very large minimum sensing distances. Embodiments herein may enable to create radar pulses with short duration, e.g., using the same OFDM numerologies as used for communication, to reduce the minimum sensing distance. The term numerology may be understood as referring to a configuration of waveform parameters, such as subcarrier spacing and/or cyclic prefix.

Figure 7:
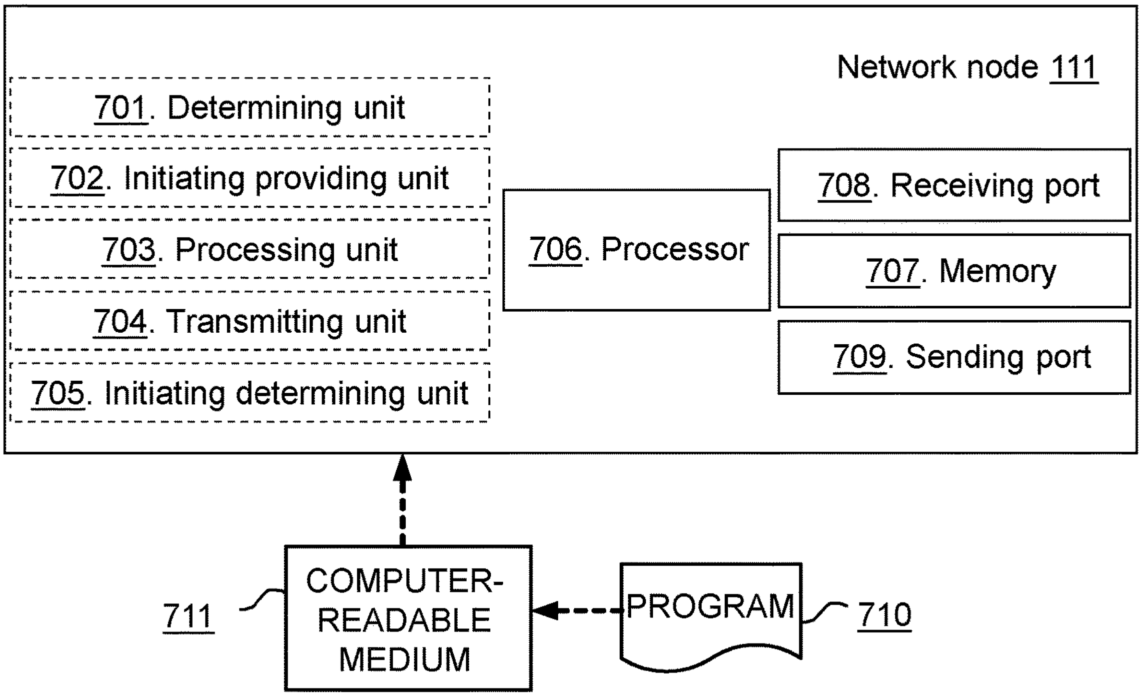
FIG. 7 is a schematic diagram illustrating embodiments of a network node, according to embodiments herein.
Figure 7:
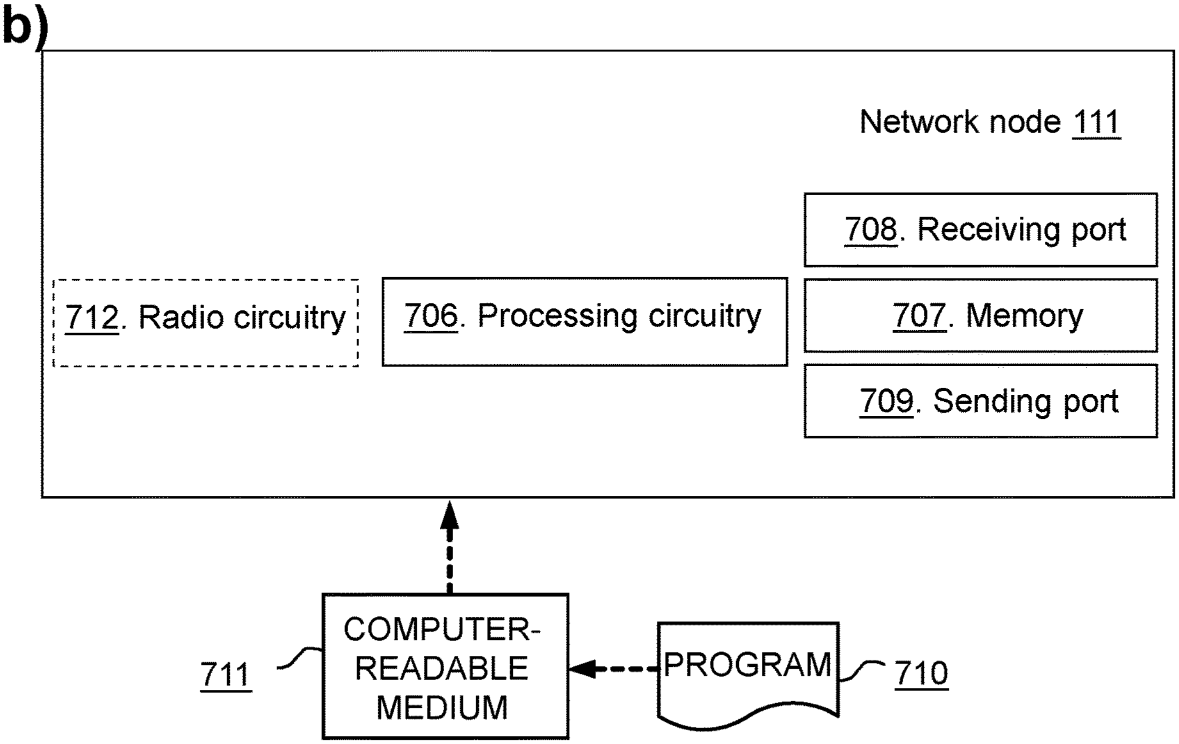

To perform the method actions described above in relation to FIG. 4, FIG. 5 and/or FIG. 6, the network node 111 may comprise the following arrangement depicted in FIG. 7. The network node 111 may be understood to be for determining modulation symbols. The network node 111 is configured to comprise the modulator 121 configured to be based on DFTS-OFDM.

Several embodiments are comprised herein. Components from one embodiment may be tacitly assumed to be present in another embodiment and it will be obvious to a person skilled in the art how those components may be used in the other exemplary embodiments. In FIG. 7, optional boxes are indicated by dashed lines. The detailed description of some of the following corresponds to the same references provided above, in relation to the actions described for the network node 111 and will thus not be repeated here. For example, the network node 111 may be configured to be capable of radar operation.

The network node 111 is configured to, e.g. by means of a determining unit 701 within the network node 111 configured to, determine the modulation symbols 501 to be input into the modulator 121. Of the first set of the modulation symbols 502 configured to correspond to the duration of a DFTS-OFDM symbol, only the first subset of modulation symbols 503 are configured to be set to first values of magnitude exceeding zero by the first threshold. The modulation symbols in the first subset 503 are configured to be determined to have the first contiguity arrangement.

In some embodiments, the first contiguity arrangement may be configured to be one of the following options. According to the first option, the first contiguity arrangement may be configured to be that at least half of the modulation symbols in the first subset 503 may be adjacent to another modulation symbol in the first subset 503. According to the second option, the first contiguity arrangement may be configured to be that all the modulation symbols in the first subset 503 may be contiguous. Other examples may be configured to have a first contiguity arrangement in between these two arrangements, e.g., at least 80% of the modulation symbols in the first subset may be configured to be adjacent to another modulation symbol in the first subset.

The first contiguity arrangement may be configured to be selected based on a selected sensing distance.

The network node 111 is also configured to, e.g. by means of an initiating providing unit 702 within the network node 111 configured to, initiate providing the modulation symbols configured to be determined to the modulator 121.

In some embodiments, any symbols in the first set of modulation symbols 502 excluded from the first subset of modulation symbols 503 are configured to be set to second values of magnitude configured to be zero or larger than zero and smaller than the second threshold. The second threshold may be configured to be smaller than the first threshold.

In some embodiments, the second set of symbols 506 may be configured to be output by the modulator 121 after processing the first set of modulation symbols 502. The second set of symbols 506 may be configured to correspond to the duration of an DFTS-OFDM symbol. The first span of the first subset 503 may be configured to be determined based on the desired second span of the second subset of symbols 505, out of the second set of symbols 506, that are configured to have second values of magnitude exceeding zero by the third threshold.

In some embodiments, the symbols in the second subset of symbols 505 may be configured to be have the second contiguity arrangement wherein one of a) at least half of the modulation symbols in the second subset of symbols 505 may be configured to be adjacent to another modulation symbol in the second subset of symbols 505, and b) all the modulation symbols in the second subset of symbols 505 may be configured to be contiguous, and any symbols in the second set of symbols 506 excluded from the second subset of symbols 505 may be configured to be set to have third values of magnitude being zero or larger than zero and smaller than the fourth threshold. Other examples may be configured to have a second contiguity arrangement in between these two arrangements, e.g., at least 80% of the modulation symbols in the second subset may be configured to be adjacent to another modulation symbol in the second subset.

In some embodiments, transmission of the second subset of symbols 505 may be configured to enable the network node 111 to receive a reflected signal from an object located at a distance of the transmitter 122 of the network node 111. The second span may be configured to be based on the desired value of the distance, e.g., a desired minimum value of the distance.

The first contiguity arrangement may be configured to be selected so that transmission of the second subset of symbols may enable the network node 111 to receive the reflected signal 150 from the object 140 located at a distance of the transmitter 122 of the network node 111.

In some embodiments the modulator 121 may be further configured to be based on an IFFT operation. In some of such embodiments, the network node 111 may be further configured to, e.g. by means of a processing unit 703 within the network node 111 configured to, process the output waveform 504 of the modulator 121 after IFFT operation, by selecting the third subset of symbols 601. The third subset of symbols 601 may be configured to be one of a) selected out of the second subset of symbols 505, and spanning the complete span of the second subset of symbols 505; and b) selected out of the second set of symbols 506 and spanning the third duration exceeding the span of the second subset of symbols 505 and being shorter than the duration of one DFTS-OFDM symbol.

In some embodiments, the network node 111 may be further configured to, e.g. by means of the processing unit 703 within the network node 111 configured to, process the modulation symbols configured to be determined by applying DFT precoding, and multiplying the first output sample of the DFT-precoded modulation symbols by the first factor and the second output sample of the DFT-precoded modulation symbols by the second factor. The first factor may be configured to be different from the second factor.

In some embodiments wherein the modulator 121 may be further configured to be based on an IFFT operation, the network node 111 may be further configured to, e.g. by means of the processing unit 703 within the network node 111 configured to, process the modulation symbols configured to be determined by a) DFT precoding the modulation symbols configured to be determined and b) cyclic extending the modulation symbols configured to be determined and DFT-precoded prior to applying the IFFT operation.

In some embodiments, the multiplying may be configured to be performed on the cyclic extended and DFT-precoded modulation symbols.

In some embodiments, the determining may be configured to comprise setting the first subset 503 of modulation symbols at the offset from the beginning of the DFTS-OFDM symbol duration.

The network node 111 may be also configured to, e.g. by means of a transmitting unit 704 within the network node 111 configured to, transmit, by the transmitter 122 of the network node 111, the output waveform 504 based on the modulation symbols in the first set 503 configured to be determined.

The network node 111 may be also configured to, e.g. by means of an initiating determining unit 705 within the network node 111 configured to, initiate determining the location of the first object 140 located at the first distance from the network node 111. To initiate determining the location may be configured to be based on the first reflected signal 150 configured to be received from the first object 140 based on the output waveform 504 configured to be transmitted.

The embodiments herein may be implemented through one or more processors, such as a processor 706 in the network node 111 depicted in FIG. 7, together with computer program code for performing the functions and actions of the embodiments herein. The processor 706 may be understood herein as a hardware component, e.g., as processing circuitry. The program code mentioned above may also be provided as a computer program product, for instance in the form of a data carrier carrying computer program code for performing the embodiments herein when being loaded into the in the network node 111. One such carrier may be in the form of a CD ROM disc. It is however feasible with other data carriers such as a memory stick. The computer program code may furthermore be provided as pure program code on a server and downloaded to the network node 111.

The network node 111 may further comprise a memory 707 comprising one or more memory units. The memory 707 is arranged to be used to store obtained information, store data, configurations, schedulings, and applications etc. to perform the methods herein when being executed in the network node 111.

In some embodiments, the network node 111 may receive information, such as the first reflected signal 150 from the first object 140, through a receiving port 708. In some embodiments, the receiving port 708 may be, for example, connected to one or more antennas in network node 111. In other embodiments, the network node 111 may receive information from another structure in the wireless communications network 130 through the receiving port 708. Since the receiving port 708 may be in communication with the processor 706, the receiving port 708 may then send the received information to the processor 706. The receiving port 708 may also be configured to receive other information.

The processor 706 in the network node 111 may be further configured to transmit or send information to e.g., the first object 140 and/or another node in the wireless communications network 130, through a sending port 709, which may be in communication with the processor 706, and the memory 707.

Those skilled in the art will also appreciate that the units 701-705 described above may refer to a combination of analog and digital units, and/or one or more processors configured with software and/or firmware, e.g., stored in memory, that, when executed by the one or more processors such as the processor 706, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 701-705 described above may be implemented as one or more applications running on one or more processors such as the processor 706.

Thus, the methods according to the embodiments described herein for the network node 111 may be respectively implemented by means of a computer program 710 product, comprising instructions, i.e., software code portions, which, when executed on at least one processor 706, cause the at least one processor 706 to carry out the actions described herein, as performed by the network node 111. The computer program 710 product may be stored on a computer-readable storage medium 711. The computer-readable storage medium 711, having stored thereon the computer program 710, may comprise instructions which, when executed on at least one processor 706, cause the at least one processor 706 to carry out the actions described herein, as performed by the network node 111. In some embodiments, the computer-readable storage medium 711 may be a non-transitory computer-readable storage medium, such as a CD ROM disc, a memory stick, or stored in the cloud space. In other embodiments, the computer program 710 product may be stored on a carrier containing the computer program, wherein the carrier is one of an electronic signal, optical signal, radio signal, or the computer-readable storage medium 711, as described above.

The network node 111 may comprise an interface unit to facilitate communications between the network node 111 and other nodes or devices, or any of the other nodes. In some particular examples, the interface may, for example, include a transceiver configured to transmit and receive radio signals over an air interface in accordance with a suitable standard.

In other embodiments, the network node 111 may comprise the following arrangement depicted in FIG. 7*b*. The network node 111 may comprise a processing circuitry 706, e.g., one or more processors such as the processor 706, in the network node 111 and the memory 707. The network node 111 may also comprise a radio circuitry 712, which may comprise e.g., the receiving port 708 and the sending port 709. The processing circuitry 706 may be configured to, or operable to, perform the method actions according to FIG. 4, FIG. 5 and/or FIG. 6 in a similar manner as that described in relation to FIG. 7*a*. The radio circuitry 712 may be configured to set up and maintain a wireless connection with one or more other nodes or one or more devices and/or another structure in the communications network 10.

Hence, embodiments herein also relate to the network node 111 operative to determine modulation symbols, the network node 111 being operative to comprise the modulator 121 operative to be based on DFTS-OFDM. The network node 111 may comprise the processing circuitry 706 and the memory 707, said memory 707 containing instructions executable by said processing circuitry 706, whereby the network node 111 is further operative to perform the actions described herein in relation to the network node 111, e.g., in FIG. 4, FIG. 5 and/or FIG. 6.

Alternative Implementation: Short Pulses Using OFDM

Figure 4:
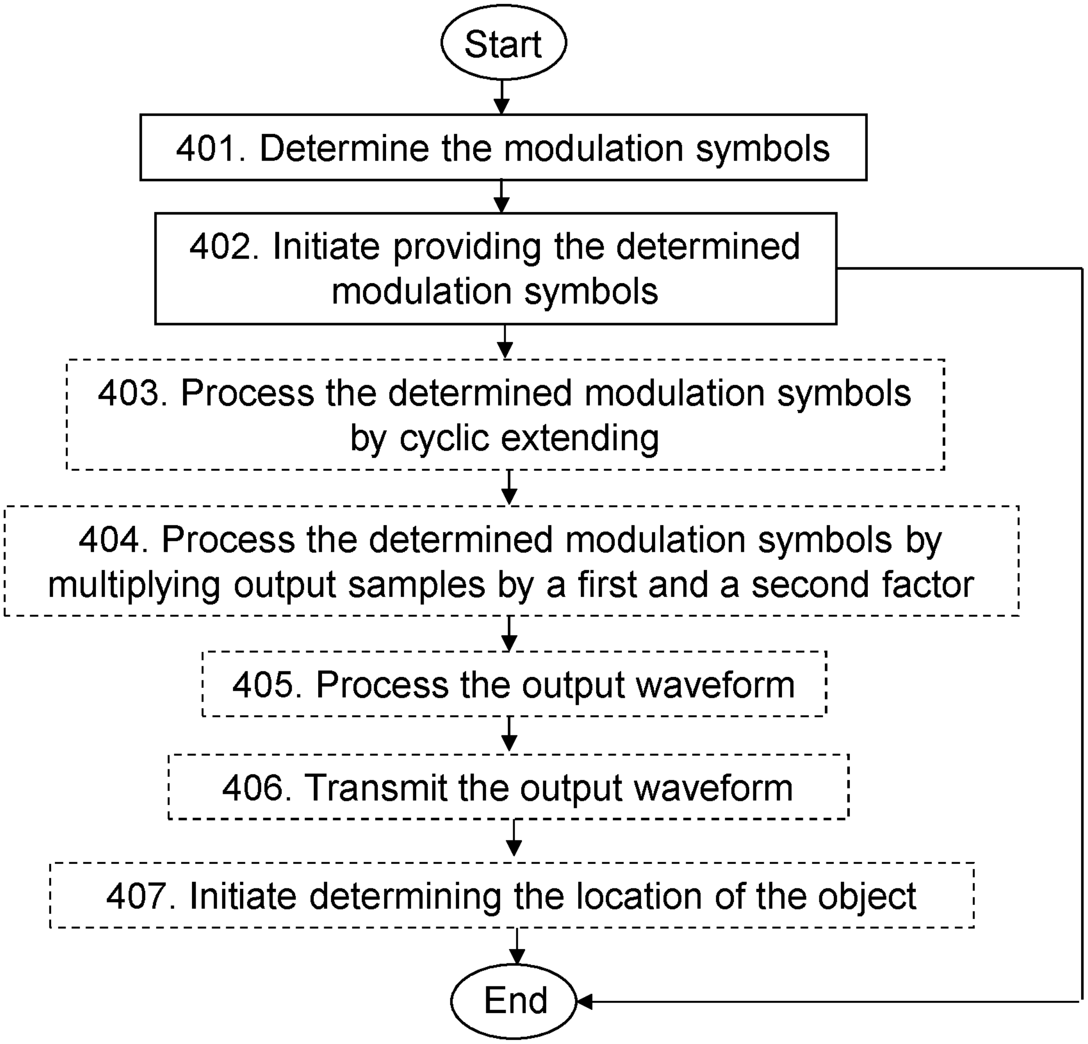
FIG. 4 is a flowchart depicting embodiments of a method in a network node, according to embodiments herein.

In an alternative implementation of the network node 111 to that described in FIG. 4 and FIG. 7, the modulator 211 comprised in the network node 111 may be based on OFDM. In such alternative implementation, the network node 111 may have a similar arrangement to that described in FIG. 7, with the exception of the respective functionality of units 701-705. The network node 111 may instead configured to, via an alternative determining unit, to modulate only every K-th subcarrier for OFDM. This may be understood to enable the alternative version of the network node 111 to generate an output waveform that may repeat itself K-times within an OFDM symbol duration. The transceiver may be in TX mode over one or more such repetitions and then switch to RX after one or a few of these repetitions to generate a radar pulse that may be shorter than the OFDM symbol duration. According to such alternative implementation, in an OFDM system, the alternative network node 111 may only use every K-th subcarrier. An abrupt truncation of the waveform may, as described above, lead to higher out-of-band emissions. To mitigate this also here, the waveform may be truncated in time using a smooth time-domain window.

The same sequence as above may be applied as input to the OFDM modulator of the alternative implementation of the network node 111. If the generated waveform should have low PAPR, a Zadoff-Chu sequence may be a good choice.

Using every K-th subcarrier may be understood to effectively generate an OFDM waveform with K-times the subcarrier spacing. However, the advantage of the proposed method may be understood to be that the baseband circuitry may not need to be changed between communication and RADAR/sensing. The same OFDM modulator as used for communication may also be used in RADAR/sensing, but only every K-th subcarrier may be used.

Figure 8:
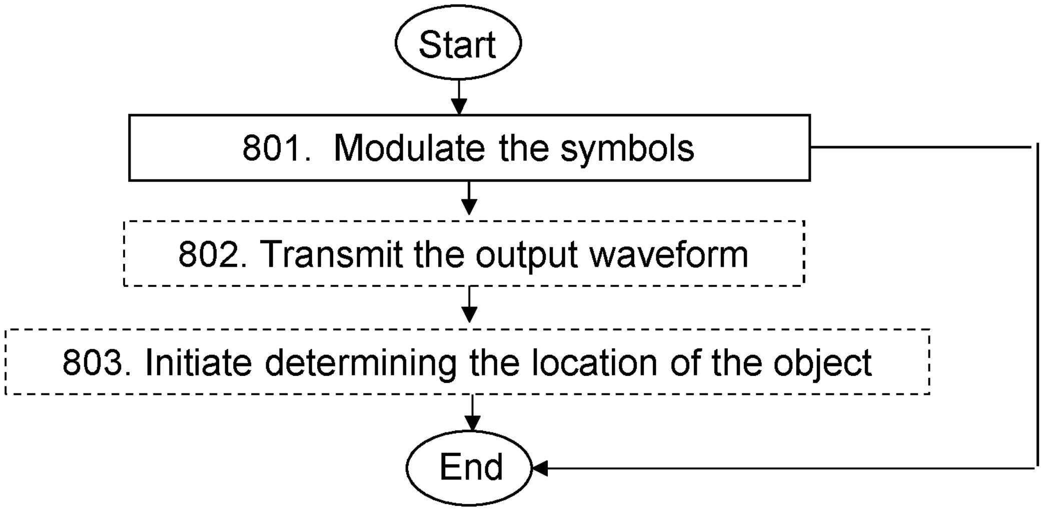
FIG. 8 is an example method performed by a network node according to embodiments herein.

Embodiments of another method performed by the network node 111, will now be described with reference to the flowchart depicted in FIG. 8. The method may be understood to be for determining modulation symbols. The network node 111 comprises the modulator 121. The modulator 121 in these alternative embodiments is based on OFDM.

In some examples, the network node 111 may operate in the wireless communications network 130.

In some embodiments, all the actions may be performed. In some embodiments, one or more actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 8, optional actions are indicated with dashed lines. Some actions may be performed in a different order than that shown in FIG. 8.

Action 801

In this Action 801, the network node 111 may modulate modulation symbols with the modulator 121, wherein the network node 111 modulates only every K-th subcarrier for OFDM.

Action 802

In this Action 802, the network node 111 may transmit, by the transmitter 122 of the network node 111, an output waveform based on the modulated symbols.

The transmitting in this Action 802 may be performed after application of an IFFT operation.

In some embodiments, the output waveform may be transmitted after having processed the output waveform of the modulator 121 after IFFT operation, by selecting a particular subset of symbols, similarly to how it was described in Action 403.

Action 803

In this Action 803, the network node 111 may initiate determining a location of the first object 140 located at a first distance from the network node 111. The initiating determining in this Action 803 of the location may be based on a received reflected signal, that is, the first reflected signal 150, from the first object 140 based on the transmitted output waveform in Action 802.

Initiating determining may be understood as determining, calculating, estimating, deriving itself, or enabling or triggering another node to determine, calculate, estimate or derive it. This latter case may correspond to a scenario wherein the network node 111 may be a distributed node which may enable the determination of the location of the first object to be performed by another in the cloud, after the first reflected signal 150 may have been received by the network node 111.

Figure 9:
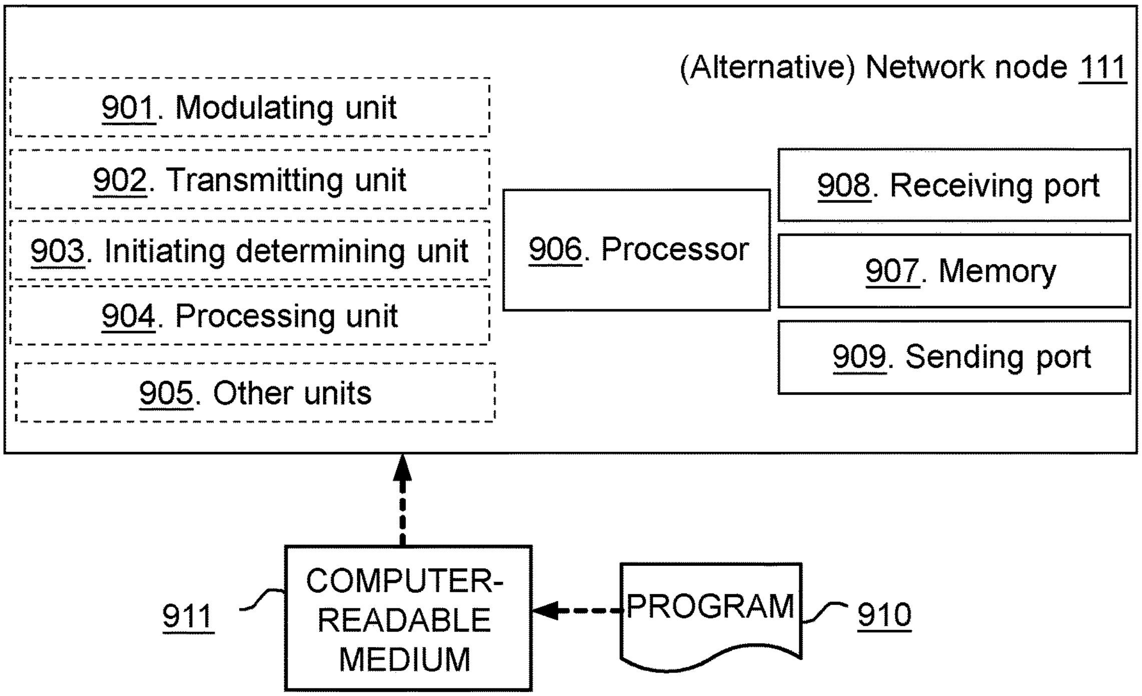
FIG. 9 is a schematic diagram illustrating alternative embodiments of a network node, according to embodiments herein.
Figure 9:
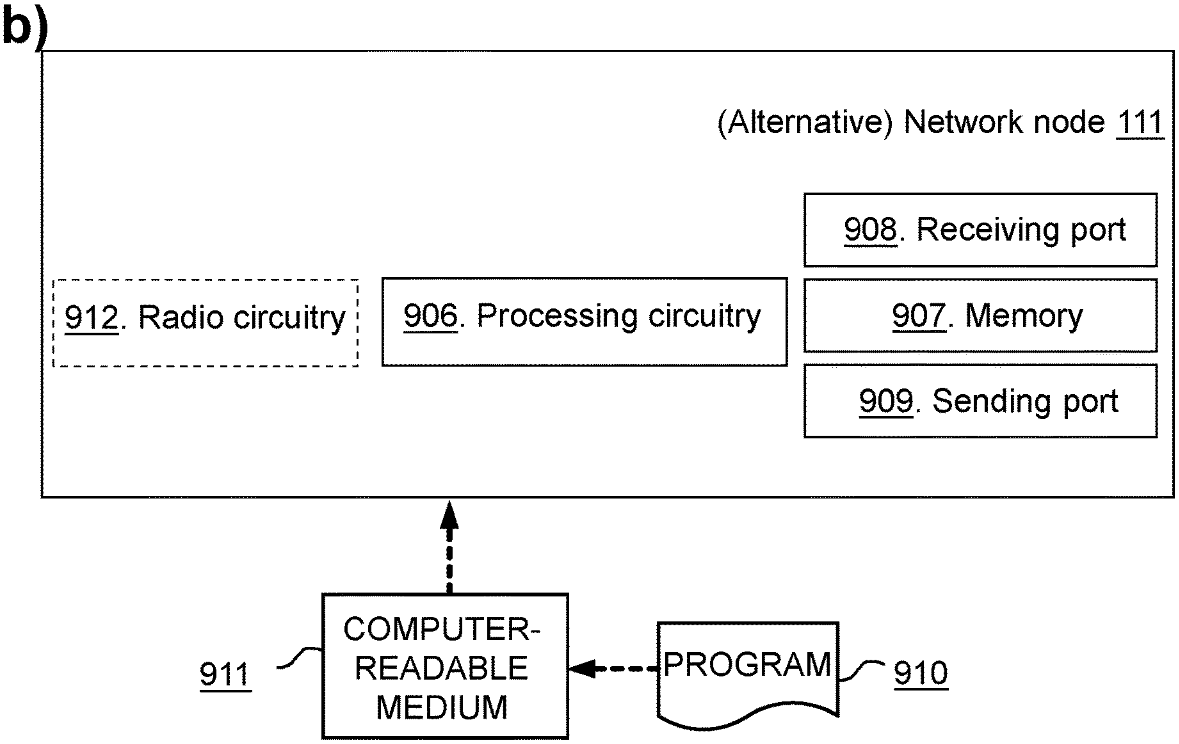

To perform the method actions described above in relation to FIG. 8, alternative, the network node 111 may comprise the following arrangement depicted in FIG. 9. The network node 111 in these alternative embodiments may be understood to be for modulating symbols. The network node 111 may be configured to comprise the modulator 121, configured to be based on OFDM.

Several embodiments are comprised herein. Components from one embodiment may be tacitly assumed to be present in another embodiment and it will be obvious to a person skilled in the art how those components may be used in the other exemplary embodiments. In FIG. 9, optional boxes are indicated by dashed lines. The detailed description of some of the following corresponds to the same references provided above, in relation to the actions described for the network node 111 and will thus not be repeated here. For example, the network node 111 may be configured to be capable of radar operation.

In these alternative embodiments, the network node 111 may be configured to, e.g. by means of a modulating unit 901 within the network node 111 configured to, modulate modulation symbols with the modulator 121, wherein the network node 111 is configured to modulate only every K-th subcarrier for OFDM.

In these alternative embodiments, the network node 111 may be configured to, e.g. by means of a transmitting unit 902 within the network node 111 configured to, transmit, by the transmitter 122 of the network node 111, the output waveform based on the symbols configured to be modulated. In some examples, only one or more repetitions of the output waveform may be transmitted.

In these alternative embodiments, the network node 111 may be configured to, e.g. by means of an initiating determining unit 903 within the network node 111 configured to, initiate determining the location of the first object 140 located at the first distance from the network node 111. To initiate determining the location may be configured to be based on the first reflected signal 150 configured to be received from the first object 140 based on the output waveform configured to be transmitted.

In these alternative embodiments, the network node 111 may be configured to, e.g. by means of a processing unit 904 within the network node 111 configured to, process the symbols configured to be modulated and/or the waveform configured to be output.

In some embodiments, the output waveform may be transmitted after having processed the output waveform of the modulator 121 after IFFT operation, by selecting a particular subset of symbols, similarly to how it was described in Action 403.

The alternative embodiment of the network node 111 may comprise other units 905.

The embodiments herein may be implemented through one or more processors, such as a processor 906 in the network node 111 depicted in FIG. 9, together with computer program code for performing the functions and actions of the embodiments herein. The processor 906 may be understood herein as a hardware component, e.g., as processing circuitry. The program code mentioned above may also be provided as a computer program product, for instance in the form of a data carrier carrying computer program code for performing the embodiments herein when being loaded into the in the network node 111. One such carrier may be in the form of a CD ROM disc. It is however feasible with other data carriers such as a memory stick. The computer program code may furthermore be provided as pure program code on a server and downloaded to the network node 111.

The network node 111 may further comprise a memory 907 comprising one or more memory units. The memory 907 is arranged to be used to store obtained information, store data, configurations, schedulings, and applications etc. to perform the methods herein when being executed in the network node 111.

In some embodiments, the network node 111 may receive information, such as the first reflected signal 150 from the first object 140, through a receiving port 908. In some embodiments, the receiving port 908 may be, for example, connected to one or more antennas in network node 111. In other embodiments, the network node 111 may receive information from another structure in the wireless communications network 130 through the receiving port 908. Since the receiving port 908 may be in communication with the processor 906, the receiving port 908 may then send the received information to the processor 906. The receiving port 908 may also be configured to receive other information.

The processor 906 in the network node 111 may be further configured to transmit or send information to e.g., the first object 140 and/or another node in the wireless communications network 130, through a sending port 909, which may be in communication with the processor 906, and the memory 907.

Those skilled in the art will also appreciate that the units 901-905 described above may refer to a combination of analog and digital units, and/or one or more processors configured with software and/or firmware, e.g., stored in memory, that, when executed by the one or more processors such as the processor 906, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 901-905 described above may be implemented as one or more applications running on one or more processors such as the processor 906.

Thus, the methods according to the embodiments described herein for the network node 111 may be respectively implemented by means of a computer program 710 product, comprising instructions, i.e., software code portions, which, when executed on at least one processor 906, cause the at least one processor 906 to carry out the actions described herein, as performed by the network node 111. The computer program 710 product may be stored on a computer-readable storage medium 711. The computer-readable storage medium 711, having stored thereon the computer program 710, may comprise instructions which, when executed on at least one processor 906, cause the at least one processor 906 to carry out the actions described herein, as performed by the network node 111. In some embodiments, the computer-readable storage medium 711 may be a non-transitory computer-readable storage medium, such as a CD ROM disc, a memory stick, or stored in the cloud space. In other embodiments, the computer program 710 product may be stored on a carrier containing the computer program, wherein the carrier is one of an electronic signal, optical signal, radio signal, or the computer-readable storage medium 711, as described above.

The network node 111 may comprise an interface unit to facilitate communications between the network node 111 and other nodes or devices, or any of the other nodes. In some particular examples, the interface may, for example, include a transceiver configured to transmit and receive radio signals over an air interface in accordance with a suitable standard.

In other embodiments, the network node 111 may comprise the following arrangement depicted in FIG. 9*b*. The network node 111 may comprise a processing circuitry 906, e.g., one or more processors such as the processor 906, in the network node 111 and the memory 907. The network node 111 may also comprise a radio circuitry 712, which may comprise e.g., the receiving port 908 and the sending port 909. The processing circuitry 906 may be configured to, or operable to, perform the method actions according to FIG. 8 in a similar manner as that described in relation to FIG. 9*a*. The radio circuitry 712 may be configured to set up and maintain a wireless connection with one or more other nodes or one or more devices and/or another structure in the communications network 10.

Hence, alternative embodiments herein also relate to the network node 111 operative to modulate symbols, the network node 111 being operative to comprise the modulator 121 operative to be based on OFDM. The network node 111 may comprise the processing circuitry 906 and the memory 907, said memory 907 containing instructions executable by said processing circuitry 906, whereby the network node 111 is further operative to perform the actions described herein in relation to the network node 111, e.g., in FIG. 8.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

The invention claimed is:

1. A method, performed by a network node, the method being for determining modulation symbols, the network node comprising a modulator based on Discrete-time Fourier Transform Spread, DFTS, Orthogonal Frequency-Division Multiplexing, OFDM, the method comprising:

determining modulation symbols to be input into the modulator such that, of a first set of the modulation symbols corresponding to a duration of a DFTS-OFDM symbol, only a first subset of modulation symbols are set to first values of magnitude exceeding zero by a first threshold, the modulation symbols in the first subset being determined to have a first contiguity arrangement, at least half of the modulation symbols in the first subset of the first contiguity arrangement adjacent to another modulation symbol in the first subset, the first contiguity arrangement being that all the modulation symbols in the first subset are contiguous and the determined modulation symbols enabling the modulator to process the modulation symbols and generate an output waveform comprising a pulse having an effective duration shorter than the OFDM symbol duration;

initiating providing the determined modulation symbols to the modulator;

the network node being capable of radio detection and ranging system, RADAR, operation and the method further comprising mapping modulation symbols of a desired RADAR pulse only to a contiguous fraction of DFTS-OFDM input modulation symbols; and generating RADAR pulses that are shorter in duration than the OFDM symbol duration, thereby reducing a minimum sensing distance of the network node.

2. The method according to claim 1, wherein the first contiguity arrangement is all the modulation symbols in the first subset are contiguous.

3. The method according to claim 1, wherein any symbols in the first set of modulation symbols excluded from the first subset of modulation symbols are set to second values of magnitude being zero or larger than zero and smaller than a second threshold, the second threshold being smaller than the first threshold.

4. The method according to claim 1, wherein a second set of symbols is to be output by the modulator after processing the first set of modulation symbols, the second set of symbols corresponding to a duration of an DFTS-OFDM symbol, and wherein a first span of the first subset is determined based on a desired second span of a second subset of symbols, out of the second set of symbols, that are to have second values of magnitude exceeding zero by a third threshold.

5. The method according to claim 4, wherein the symbols in the second subset of symbols have a second contiguity arrangement wherein one of: a) at least half of the modulation symbols in the second subset of symbols are adjacent to another modulation symbol in the second subset of symbols, and b) all the modulation symbols in the second subset of symbols are contiguous, and wherein any symbols in the second set of symbols excluded from the second subset of symbols are set to have third values of magnitude being zero or larger than zero and smaller than a fourth threshold.

6. The method according to claim 4, wherein transmission of the second subset of symbols enables the network node to receive a reflected signal from an object located at a distance of a transmitter of the network node, and wherein the second span is based on a desired value of the distance.

7. The method according to claim 4, wherein the modulator is further based on an Inverse Fast Fourier Transform, IFFT, operation, and wherein the method further comprises:

processing an output waveform of the modulator after IFFT operation, by selecting a third subset of symbols, the third subset of symbols being one of:

a. selected out of the second subset of symbols, and spanning a complete span of the second subset of symbols; and b. selected out of the second set of symbols and spanning a third duration exceeding the span of the second subset of symbols and being shorter than the duration of one DFTS-OFDM symbol.

8. The method according to claim 1, wherein the method further comprises:

processing the determined modulation symbols by applying DFT precoding, and multiplying a first output sample of the DFT-precoded modulation symbols by a first factor and a second output sample of the DFT-precoded modulation symbols by a second factor, wherein the first factor is different from the second factor.

9. The method according to claim 1, wherein the modulator is further based on an Inverse Fast Fourier Transform, IFFT, operation, and wherein the method further comprises:

processing the determined modulation symbols by a) DFT precoding the determined modulation symbols and b) cyclic extending the determined and DFT-precoded modulation symbols prior to applying the IFFT operation.

10. The method of claim 8, wherein the multiplying is performed on the cyclic extended and DFT-precoded modulation symbols.

11. The method according to claim 1, wherein the determining comprises setting the first subset of modulation symbols at an offset from a beginning of the DFTS-OFDM symbol duration.

12. The method according to claim 4, further comprising:

transmitting, by a transmitter of the network node, an output waveform based on the determined modulation symbols in the first set.

13. The method according to claim 12, further comprising:

initiating determining a location of a first object located at a first distance from the network node, the initiating determining of the location being based on a received first reflected signal from the first object based on the transmitted output waveform.

14. A network node, for determining modulation symbols, the network node comprising a modulator configured to be based on Discrete-time Fourier Transform Spread, DFTS, Orthogonal Frequency-Division Multiplexing, OFDM, the network node being further configured to:

determine modulation symbols to be input into the modulator such that, of a first set of the modulation symbols configured to correspond to a duration of a DFTS-OFDM symbol, only a first subset of modulation symbols are configured to be set to first values of magnitude exceeding zero by a first threshold, the modulation symbols in the first subset being configured to have a first contiguity arrangement, at least half of the modulation symbols in the first subset of the first contiguity arrangement adjacent to another modulation symbol in the first subset, the first contiguity arrangement being that all the modulation symbols in the first subset are contiguous and the determined modulation symbols enabling the modulator to process the modulation symbols and generate an output waveform comprising a pulse having an effective duration shorter than the OFDM symbol duration;

initiate providing the modulation symbols configured to be determined to the modulator;

the network node being capable of radio detection and ranging system, RADAR, operation and configured to map modulation symbols of a desired RADAR pulse only to a contiguous fraction of DFTS-OFDM input modulation symbols; and generate RADAR pulses that are shorter in duration than the OFDM symbol duration, thereby reducing a minimum sensing distance of the network node.

15. The method according to claim 14, wherein the first contiguity arrangement is configured to be at least half of the modulation symbols in the first subset are configured to be adjacent to another modulation symbol in the first subset.

16. The network node according to claim 14, wherein any symbols in the first set of modulation symbols excluded from the first subset of modulation symbols are configured to be set to second values of magnitude configured to be zero or larger than zero and smaller than a second threshold, the second threshold being configured to be smaller than the first threshold.

17. The network node according to claim 14, wherein a second set of symbols is configured to be output by the modulator after processing the first set of modulation symbols, the second set of symbols being configured to correspond to a duration of an DFTS-OFDM symbol, and wherein a first span of the first subset is configured to be determined based on a desired second span of a second subset of symbols, out of the second set of symbols, that are configured to have second values of magnitude exceeding zero by a third threshold.

18. The network node according to claim 17, wherein the symbols in the second subset of symbols are configured to have a second contiguity arrangement wherein one of: a) at least half of the modulation symbols in the second subset of symbols are configured to be adjacent to another modulation symbol in the second subset of symbols, and b) all the modulation symbols in the second subset of symbols are configured to be contiguous, and wherein any symbols in the second set of symbols excluded from the second subset of symbols are configured to be set to have third values of magnitude being zero or larger than zero and smaller than a fourth threshold.

19. The network node according to claim 17, wherein transmission of the second subset of symbols is configured to enable the network node to receive a reflected signal from an object located at a distance of a transmitter of the network node, and wherein the second span is configured to be based on a desired value of the distance.

* * * * *